(12) United States Patent
Mao et al.

(10) Patent No.: US 8,889,019 B1
(45) Date of Patent: Nov. 18, 2014

(54) SUPER SHALLOW LAMINATED HARD MASK STENCIL FOR MAGNETIC READ SENSOR FABRICATION

(71) Applicant: HGST Netherlands B.V., Amsterdam (NL)

(72) Inventors: Guomin Mao, San Jose, CA (US); Hicham Moulay Sougrati, Elk Grove, CA (US); Yi Zheng, San Ramon, CA (US)

(73) Assignee: HGST Netherlands B.V., Amsterdam (NL)

( * ) Notice: Subject to any disclaimer, the term of this patent is extended or adjusted under 35 U.S.C. 154(b) by 33 days.

(21) Appl. No.: 13/907,617

(22) Filed: May 31, 2013

(51) Int. Cl.
   *G11B 5/127* (2006.01)
   *B44C 1/22* (2006.01)

(52) U.S. Cl.
   CPC ..................................... *G11B 5/127* (2013.01)
   USPC .......................................... 216/22; 29/603.07

(58) Field of Classification Search
   None
   See application file for complete search history.

(56) References Cited

U.S. PATENT DOCUMENTS

| | | | |
|---|---|---|---|
| 6,700,759 B1 | 3/2004 | Knapp et al. | |
| 6,861,177 B2 | 3/2005 | Pinarbasi et al. | |
| 6,969,625 B2 * | 11/2005 | Cyrille et al. | 438/24 |
| 7,037,847 B2 | 5/2006 | Le et al. | |
| 7,378,226 B2 | 5/2008 | Chen et al. | |
| 8,216,481 B2 | 7/2012 | Hong | |
| 8,252,516 B2 | 8/2012 | Le et al. | |
| 8,296,930 B2 * | 10/2012 | Funada et al. | 29/603.14 |
| 8,468,683 B2 * | 6/2013 | Mao et al. | 29/603.16 |
| 8,646,168 B2 * | 2/2014 | Mao et al. | 29/603.16 |
| 8,796,152 B2 * | 8/2014 | Mao et al. | 438/712 |
| 8,801,944 B2 * | 8/2014 | Mao et al. | 216/22 |
| 2005/0041341 A1 * | 2/2005 | Cyrille et al. | 360/324 |
| 2006/0273066 A1 | 12/2006 | Bedell et al. | |
| 2008/0062584 A1 | 3/2008 | Freitag et al. | |
| 2011/0089140 A1 | 4/2011 | Hong | |
| 2012/0125883 A1 * | 5/2012 | Mao et al. | 216/22 |
| 2012/0125884 A1 * | 5/2012 | Chung et al. | 216/22 |
| 2012/0156390 A1 * | 6/2012 | Araki et al. | 427/534 |
| 2013/0081263 A1 * | 4/2013 | Mao et al. | 29/603.18 |
| 2013/0082027 A1 * | 4/2013 | Mao et al. | 216/22 |
| 2013/0104388 A1 * | 5/2013 | Mao et al. | 29/603.27 |
| 2013/0284693 A1 * | 10/2013 | Zheng et al. | 216/22 |
| 2014/0144872 A1 * | 5/2014 | Mao et al. | 216/22 |
| 2014/0170774 A1 * | 6/2014 | Mao et al. | 438/3 |

OTHER PUBLICATIONS

Chen et al.; "Self Aligned, Very Narrow Trackwidth Inductive Thin Film Heads for Very High Track Density"; IBM Technical Disclosure Bulletin; Aug. 1992, San Jose, CA USA pp. 157-159.

* cited by examiner

*Primary Examiner* — Allan Olsen
(74) *Attorney, Agent, or Firm* — Patterson & Sheridan, LLP

(57) ABSTRACT

The present invention generally relates to methods for forming a sensor structure utilizing a shallow and narrow hard mask stencil. In one embodiment, a sensor structure is formed by utilizing a four-layered hard mask stencil. The four-layered hard mask stencil includes a first mask layer, a second mask layer disposed over the first hard mask, a third mask layer disposed over the second mask layer, and a forth mask layer disposed over the third mask layer. In another embodiment, a sensor structure is formed by utilizing a three-layered hard mask stencil. The three-layered hard mask stencil includes a first mask layer, a second mask layer disposed over the first mask layer, and a third mask layer disposed over the second mask layer. The sensor structure is formed with a two-step chemical mechanical planarization (CMP) process.

24 Claims, 10 Drawing Sheets

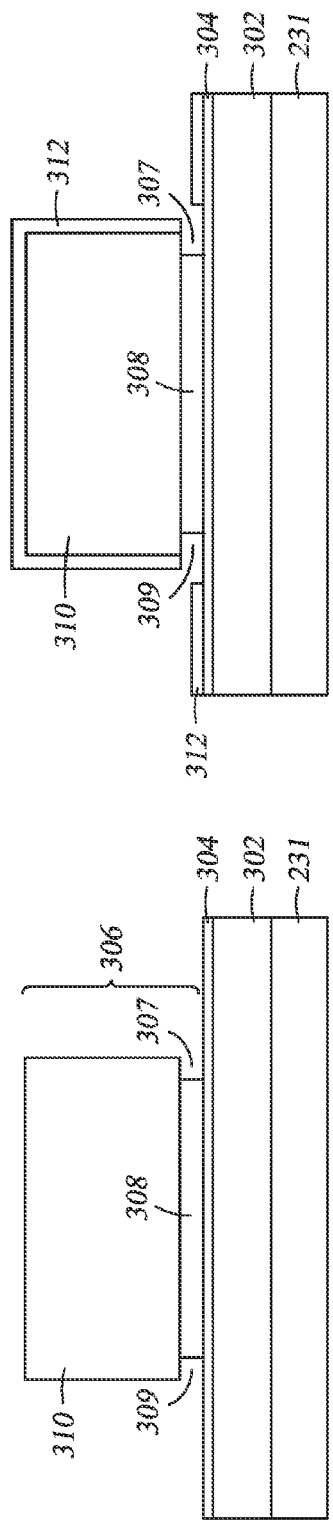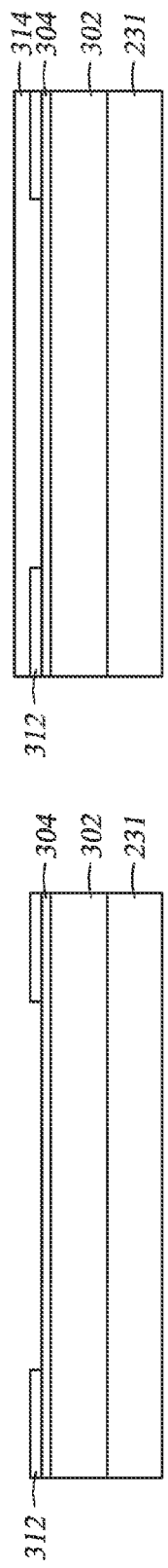

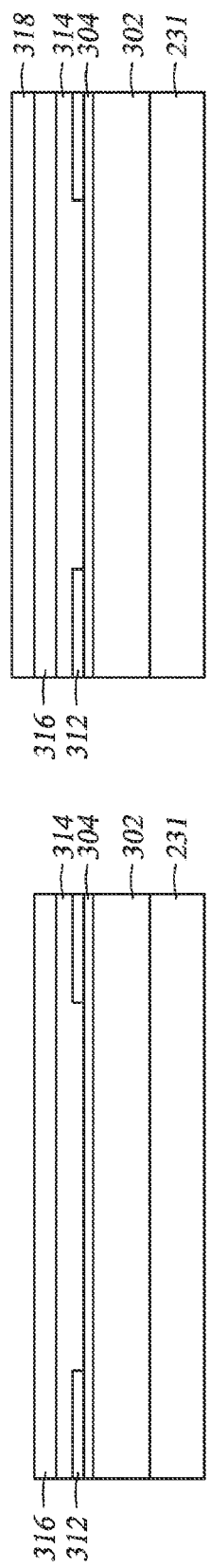
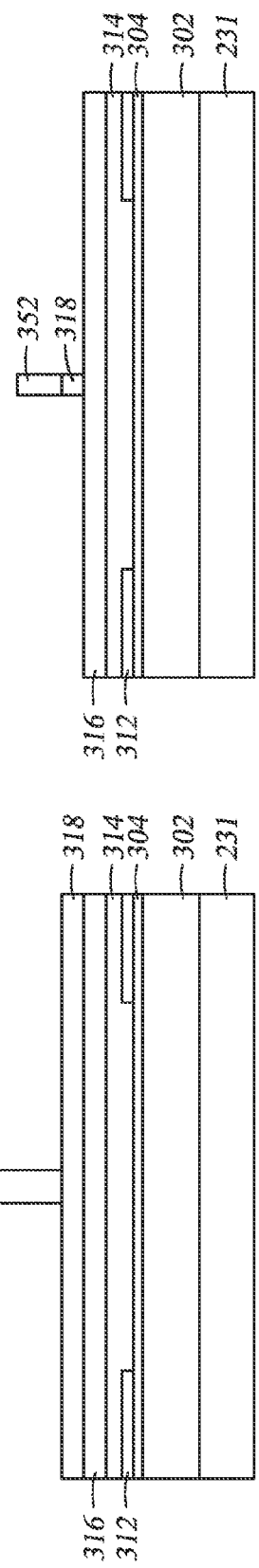

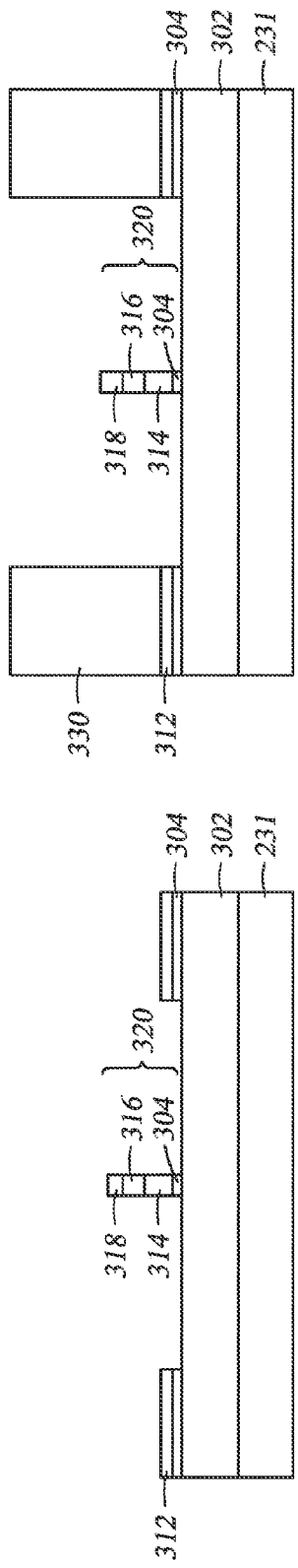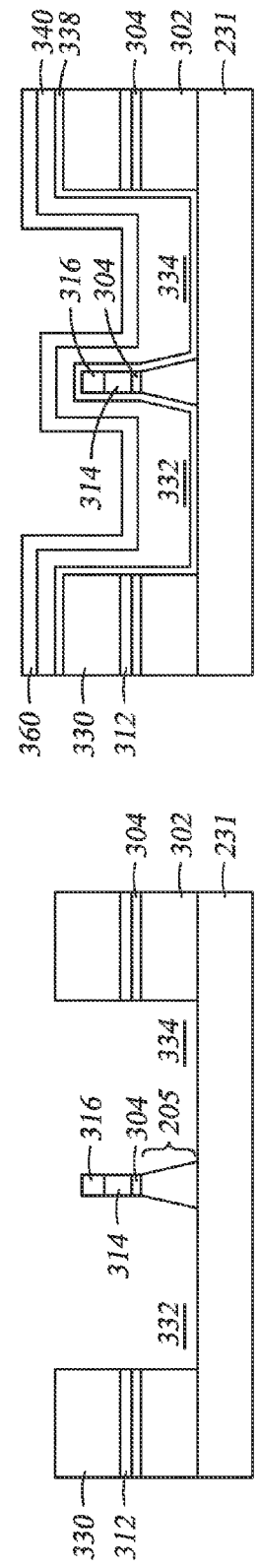

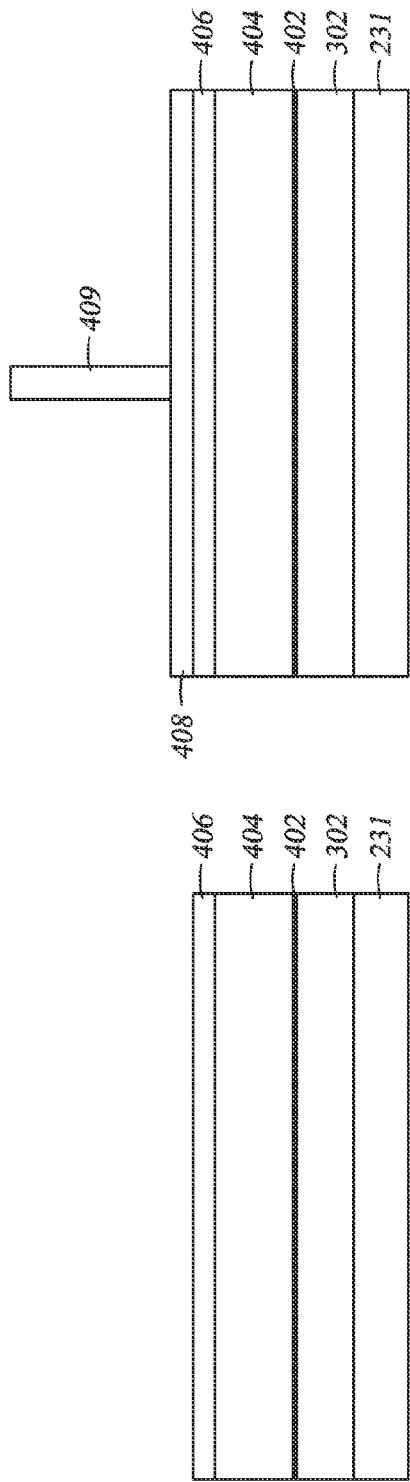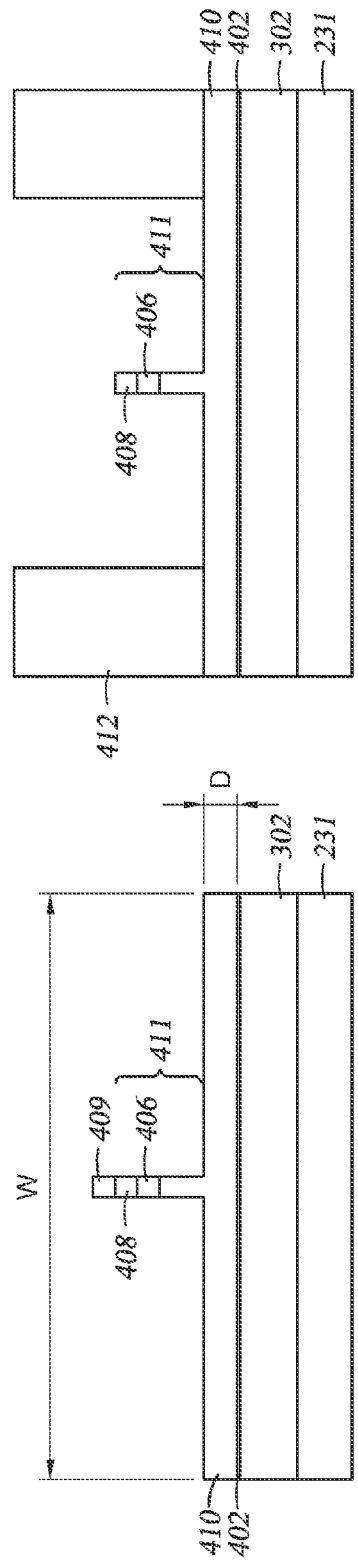

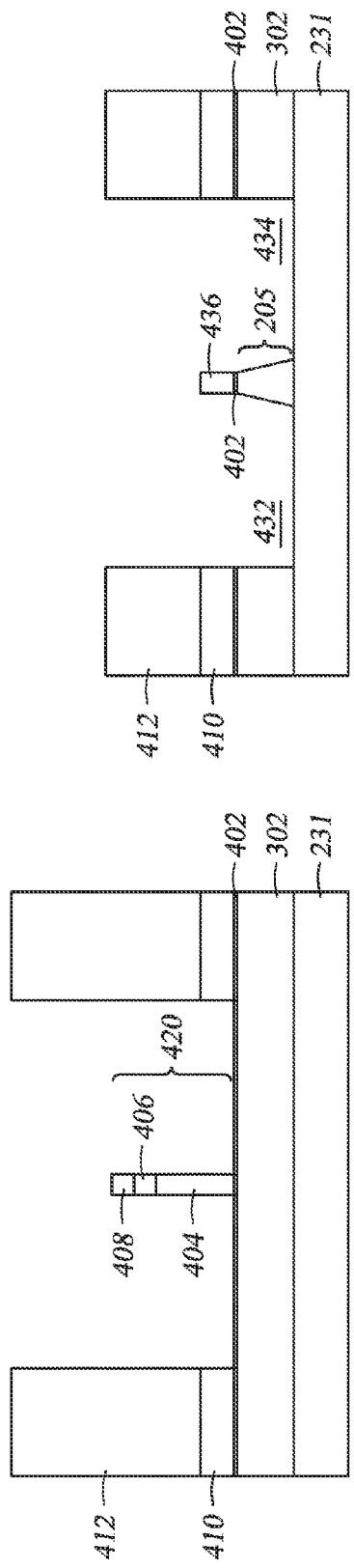
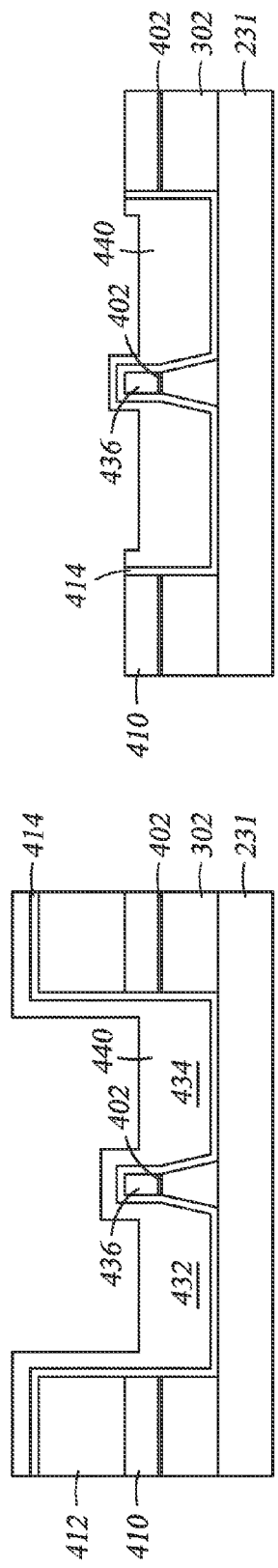
Fig. 4F
Fig. 4G
Fig. 4H
Fig. 4I

SUPER SHALLOW LAMINATED HARD MASK STENCIL FOR MAGNETIC READ SENSOR FABRICATION

BACKGROUND

1. Field

Embodiments of the present invention generally relate to methods of making a magnetic read sensor. More particularly, embodiments of the present invention relate to methods of making a magnetic read sensor utilizing a super shallow laminated hard mask stencil.

2. Description of the Related Art

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider towards the surface of the disk when the disk is not rotating but, when the disk rotates, air is swirled by the rotating disk and the adjacent air bearing surface (ABS) of the slider causes the slider to ride on an air bearing with a slight distance from the surface of the rotating disk. When the slider rides on the air bearing, the write and read heads are employed for writing magnetic impressions to and reading magnetic signals from the rotating disk. The read and write heads are connected to processing circuitry that operates according to a computer program to implement the writing and reading functions.

To construct a read head, a plurality of sensor layers are deposited across the surface of a substrate. One or more mask layers are deposited over the sensor layers and a series of photolithographic processes and reactive ion etch (RIE) processes are then conducted to form a mask stencil above the sensor layers. An ion milling process then removes unmasked portions of the sensor layers to define the shape, profile and dimension (such as track width) of the read head sensor.

In order to achieve greater data storage density on the magnetic media, magnetic data bits are written in increasingly smaller sizes. The read head is therefore fabricated with a reduced track width to properly read the smaller sized data bits. Therefore, there is a need in the art for an improved method for forming the narrow read head.

SUMMARY

The present invention generally relates to methods for forming a sensor structure utilizing a shallow and narrow hard mask stencil. In one embodiment, a sensor structure is formed by utilizing a four-layered hard mask stencil. The four-layered hard mask stencil includes a first mask layer, a second mask layer disposed over the first hard mask, a third mask layer disposed over the second mask layer, and a forth mask layer disposed over the third mask layer. In another embodiment, a sensor structure is formed by utilizing a three-layered hard mask stencil. The three-layered hard mask stencil includes a first mask layer, a second mask layer disposed over the first mask layer, and a third mask layer disposed over the second mask layer. The sensor structure is formed with a two-step chemical mechanical planarization (CMP) process.

In one embodiment, a method for forming a read head is disclosed. The method includes forming a sensor layer on a substrate, forming a first mask layer over the sensor layer; forming a patterned bi-layer structure over a portion of the first mask layer, forming a RIE (reactive ion etch) stop layer over the first mask layer and the bi-layer structure, and removing the bi-layer structure and the portion of the RIE stop layer disposed over the bi-layer structure to expose a portion of the first mask layer. The area covered by the RIE stop layer is called the field area, and the area not covered by the RIE stop layer is called the device area.

The method further includes forming a second mask layer over RIE stop layer (i.e., in the field area) and also over the exposed first mask layer (i.e., in the device area), forming a third mask layer over the second mask layer, forming a fourth mask layer over the third mask layer, forming a patterned photoresist mask in the device area using lithography process over the fourth mask layer, leaving portions of the device area and the entire field area exposed, then removing a portion of the fourth mask layer using a first RIE with certain amount of over-etch that the fourth mask layer is completely etched through in the area not protected by the photoresist mask and exposing portion of the third mask layer.

The method further includes applying a second RIE process, which capable of selectively etch the photoresist mask, the third, the second and the first mask layer without (or with minimum) etch to the fourth mask layer and the RIE stop layer, forming a hard mask stencil (in the device area) consisting of four mask layers (i.e., the fourth, the third, the second, and the first mask layer) without photoresist residue disposed thereon. The device area is further divided into two areas, one is the stencil, another is channel area where the header sensor is not covered by the stencil and is exposed. The stencil is surrounded by the channel area. The third and second mask layer in the field area are also removed in the second RIE process, however the first mask layer in the field is not etched by the second RIE since the first mask layer is protected by the RIE stop layer.

The method further includes forming a patterned photoresist mask on the RIE stop layer and leaving device area (including stencil and channel area) exposed. Thereafter an ion mill process is performed, the sensor layer in the channel area is etched away, the sensor layer under the stencil is protected by the stencil, and a reader sensor junction shape is formed under the stencil. The third mask layer of the stencil and partial of the second layer of the stencil are consumed during ion mill process, and the remaining of the second mask layer and first mask layer are still on the stencil. The RIE stop layer and the first mask layer in the field area is protected by the photoresist mask thus not etched by the ion mill, however, portions of the photomask are consumed in the ion mill.

The method further includes forming an dielectric insulation layer (or layers) covering remaining stencil, channel areas and photoresist in field area, forming a hard bias layer on top of the dielectric layer, forming a cap layer on hard bias layer, removing the cap layer, the hard bias layer and the dielectric layer in the field area by a liftoff process to expose the RIE stop layer over the field area, removing the cap layer, the hard bias layer, the dielectric layer and the second mask layer of the stencil by a CMP process, exposing the first mask layer of the stencil, at the same time exposing the first mask layer in the field area, and partially removing the cap layer in the channel areas. A third RIE process is performed to remove the exposed first mask layer in both stencil and field area and the remaining cap layer in the channel areas, thus forming a reader junction sensor.

In another embodiment, a method for forming a read head is disclosed. The method includes forming a sensor layer on a substrate, forming a cap layer over the sensor layer, forming a first mask layer having a first thickness over the cap layer, forming a second mask layer over the first mask layer, forming a third mask layer over the second mask layer, forming a patterned photoresist mask using lithography process over the third mask layer, leaving the rest of the device area exposed, removing a portion of the third mask layer not protected by the photoresist mask using a first reactive ion etch (RIE) with certain amount of over-etch that both the third layer and the second layer in the field area and in the channel area are completely etched through and exposing portion of the first mask layer in the field area and channel area. The first RIE process forms a stack in the device area consisting of residual photoresist, the third and the second mask layer, and part of the first layer. The stack is disposed on a remaining first mask layer having a second thickness.

After forming the stack, a patterned photoresist mask is formed on the remaining first mask layer in the field area leaving the device area (i.e., the stack and the surrounding channel areas) exposed. The method further includes removing a portion of the remaining first mask layer in the channel areas using a second RIE process to etch away the remaining first mask layer in the channel areas, forming a hard mask stencil since the high etch selectivity of the third mask layer on the stencil, and leaving the photoresist mask in the field area partially etched with a remaining of thickness that is sufficient for the liftoff process later. Thereafter an ion mill process is performed to mill away the exposed sensor layer in the channel areas and a reader sensor junction shape is formed.

The method further includes forming an dielectric insulation layer (or layers) covering the stencil, device area and photoresist in field area, forming a side-shield layer on top of the dielectric layer, removing the side-shield layer and the dielectric layer in the field area by a liftoff process to expose the first mask layer having a second thickness over the field area, removing the side-shield layer and dielectric layer and the second mask layer of the stencil by a first CMP process, and exposing the first mask layer of the stencil. The exposed first mask layer in the field has high CMP selectivity thus only partially removed. The method further includes removing the exposed first mask layer in field and the first mask layer on the stencil using a third RIE process to expose the cap layer in both stencil and filed area.

The method further includes applying a second CMP to polish the portion of the side-shield. The cap layer has higher CMP selectivity that the bump-out side-shield is planarized and has the same flat surface with cap layer. Then an ion mill process with the same mill rate is used to remove the cap layer and portions of the side-shield, and a sensor junction is formed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 4A-4M illustrate the process of making the sensor structure of FIG. 2B according to another embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention generally relates to methods for forming a magnetic sensor structure utilizing a shallow and narrow hard mask stencil. In one embodiment, a sensor structure is formed by utilizing a four-layered hard mask stencil. The four-layered hard mask stencil includes a first mask layer, a second mask layer (a release layer), a third mask layer and a fourth mask layer. In another embodiment, a sensor structure is formed by utilizing a three-layered hard mask stencil. The three-layered hard mask stencil includes a first mask layer, a second mask layer, and a third mask layer. The sensor structure is formed with a two-step CMP process.

Figure 1:
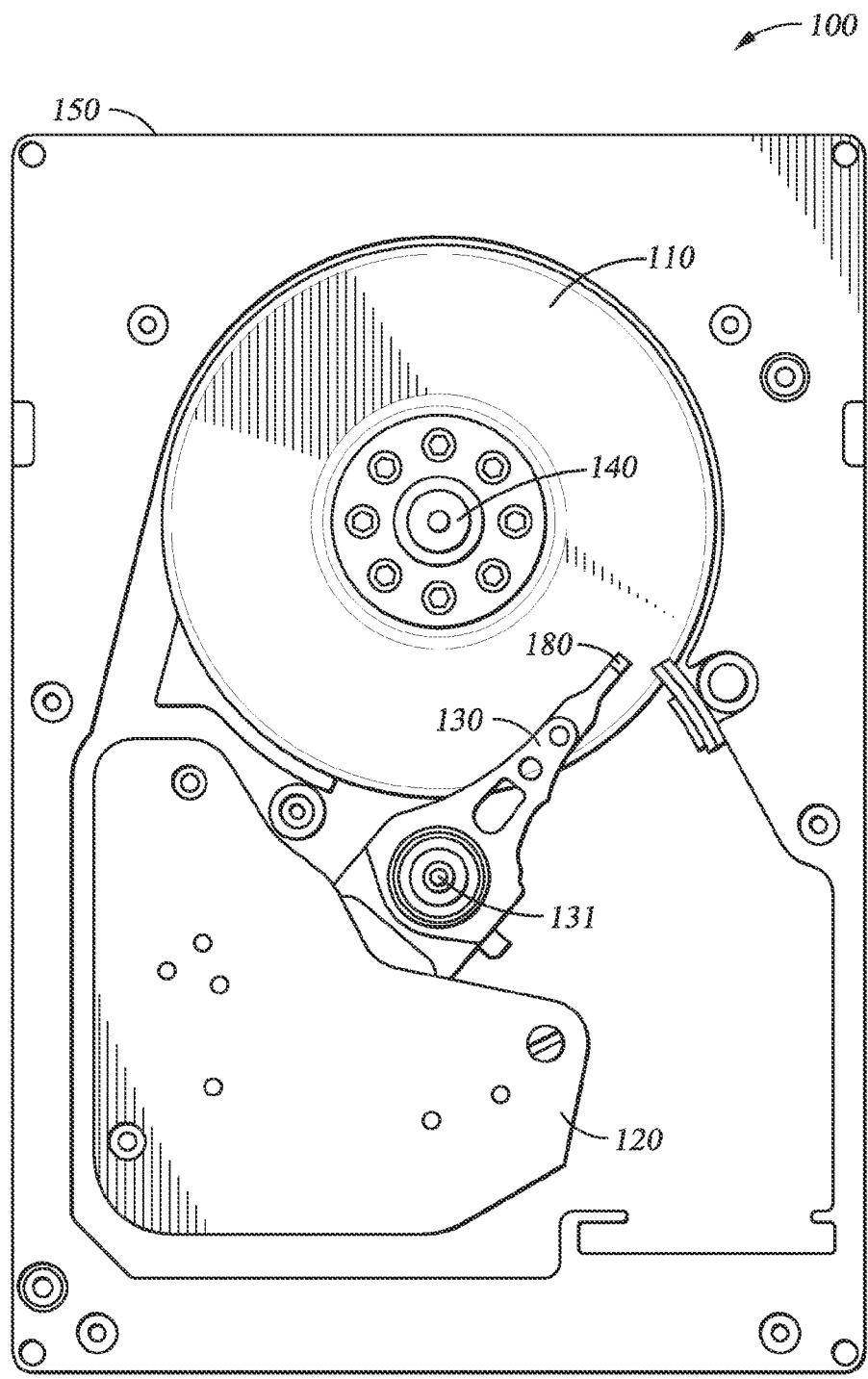
FIG. 1 illustrates an exemplary magnetic disk drive, according to an embodiment of the invention.

FIG. 1 illustrates a top view of an exemplary HDD 100, according to an embodiment of the invention. As illustrated, HDD 100 may include one or more magnetic disks 110, actuator 120, actuator arms 130 associated with each of the magnetic disks, and spindle motor 140 affixed in a chassis 150. The one or more magnetic disks 110 may be arranged vertically as illustrated in FIG. 1. Moreover, the one or more magnetic disks may be coupled with the spindle motor 140.

Magnetic disks 110 may include circular tracks of data on both the top and bottom surfaces of the disk. A magnetic head 180 mounted on a slider may be positioned on a track. As each disk spins, data may be written on and/or read from the data track. Magnetic head 180 may be coupled to an actuator arm 130 as illustrated in FIG. 1. Actuator arm 130 may be configured to swivel around actuator axis 131 to place magnetic head 180 on a particular data track.

Figure 2A:
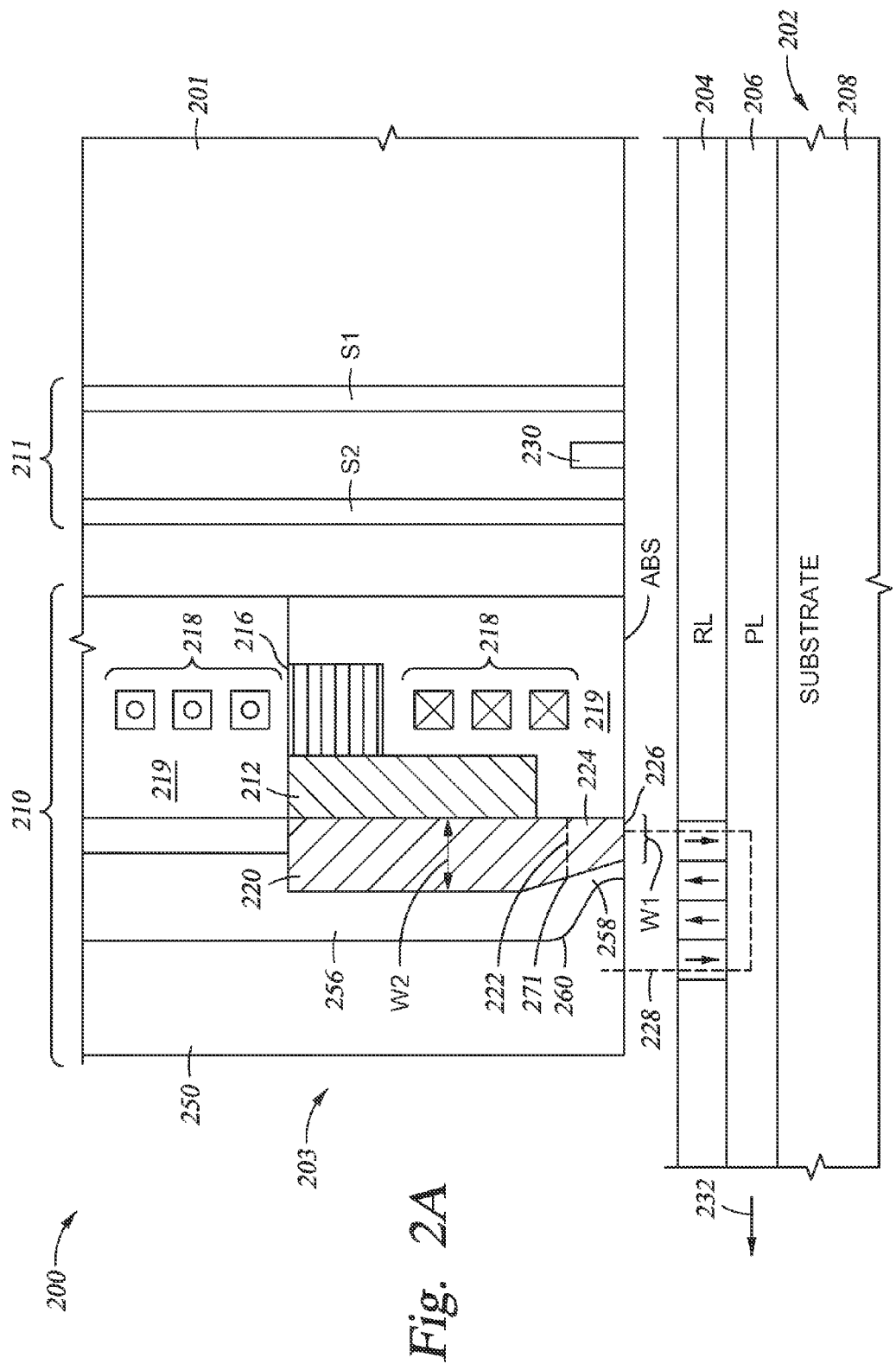
FIG. 2A is a side view of a read/write head and magnetic disk of the disk drive of FIG. 1, according to one embodiment of the invention.

FIG. 2A is a fragmented, cross-sectional side view through the center of a read/write head 200 mounted on a slider 201 and facing magnetic disk 202. The read/write head 200 and the magnetic disk 202 may correspond to the magnetic head 180 and the magnetic disk 110, respectively in FIG. 1. In some embodiments, the magnetic disk 202 may be a "dual-layer" medium that includes a perpendicular magnetic data recording layer (RL) 204 on a "soft" or relatively low-coercivity magnetically permeable underlayer (PL) 206 formed on a disk substrate 208. The read/write head 200 includes an ABS, a magnetic write head 210 and a magnetic read head 211, and is mounted such that the ABS is facing the magnetic disk 202. In FIG. 2A, the disk 202 moves past the write head 210 in the direction indicated by the arrow 232, so the portion of slider 201 that supports the read/write head 200 is often called the slider "trailing" end 203.

In some embodiments, the magnetic read head 211 is a magnetoresistive (MR) read head that includes an MR sensing element 230 located between MR shields S1 and S2. In other embodiments, the magnetic read head 211 is a magnetic tunnel junction (MTJ) read head that includes a MTJ sensing device 230 located between MR shields S1 and S2. The RL 204 is illustrated with perpendicularly recorded or magnetized regions, with adjacent regions having magnetization directions, as represented by the arrows located in the RL 204. The magnetic fields of the adjacent magnetized regions are detectable by the MR (or MTJ) sensing element 230 as the recorded bits.

The write head 210 includes a magnetic circuit made up of a main pole 212 and a yoke 216. The write head 210 also includes a thin film coil 218 shown in the section embedded in a non-magnetic material 219 and wrapped around yoke 216. In an alternative embodiment, the yoke 216 may be omitted, and the coil 218 may wrap around the main pole 212. A write pole 220 is magnetically connected to the main pole 212 and has an end 226 that defines part of the ABS of the magnetic write head 210 facing the outer surface of disk 202.

Write pole 220 is a flared write pole and includes a flare point 222 and a pole tip 224 that includes an end 226 that defines part of the ABS. The flare may extend the entire height of write pole 220 (i.e., from the end 226 of the write pole 220 to the top of the write pole 220), or may only extend from the flare point 222, as shown in FIG. 2A. In one embodiment the distance between the flare point 222 and the ABS is between about 0 nm and about 150 nm.

The write pole 220 includes a tapered surface 271 which increases a width of the write pole 220 from a first width W1 at the ABS to a second width W2 away from the ABS. In one embodiment, the width W1 may be between about 60 nm and 200 nm, and the width W2 may be between about 120 nm and 350 nm. While the tapered region 271 is shown with a single straight surface in FIG. 2A, in alternative embodiment, the tapered region 271 may include a plurality of tapered surface with different taper angles with respect to the ABS.

The tapering improves magnetic performance. For example, reducing the width W1 at the ABS may concentrate a magnetic field generated by the write pole 220 over desirable portions of the magnetic disk 202. In other words, reducing the width W1 of the write pole 220 at the ABS reduces the probability that tracks adjacent to a desirable track are erroneously altered during writing operations.

While a small width of the write pole 220 is desired at the ABS, it may be desirable to have a greater width of the write pole 220 in areas away from the ABS. A larger width W2 of the write pole 220 away from the ABS may desirably increase the magnetic flux to the write pole 220, by providing a greater thickness of the write pole 220 in a direction generally parallel to the ABS. In operation, write current passes through coil 218 and induces a magnetic field (shown by dashed line 228) from the write pole 220 that passes through the RL 204 (to magnetize the region of the RL 204 beneath the write pole 220), through the flux return path provided by the PL 206, and back to an upper return pole 250. In one embodiment, the greater the magnetic flux of the write pole 220, the greater is the probability of accurately writing to desirable regions of the RL 204.

FIG. 2A further illustrates one embodiment of the upper return pole 250 that is separated from write pole 220 by a nonmagnetic gap layer 256. In some embodiments, the upper return pole 250 may be a trailing shield wherein substantially all of the shield material is on the trailing end 203. Alternatively, in some embodiments, the upper return pole 250 may be a wrap-around shield wherein the shield covers the trailing end 203 and also wraps around the sides of the write pole 220. As FIG. 2A is a cross section through the center of the read/write head 200, it represents both trailing and wrap-around embodiments.

Near the ABS, the nonmagnetic gap layer 256 has a reduced thickness and forms a shield gap throat 258. The throat gap width is generally defined as the distance between the write pole 220 and the upper return pole 250 at the ABS. The upper return pole 250 is formed of magnetically permeable material (such as Ni, Co and Fe alloys) and gap layer 256 is formed of nonmagnetic material (such as Ta, TaO, Ru, Rh, NiCr, SiC or $Al_2O_3$). A taper 260 in the gap material provides a gradual transition from the throat gap width at the ABS to a maximum gap width above the taper 260. This gradual transition in width forms a tapered bump in the non-magnetic gap layer that allows for greater magnetic flux density from the write pole 220, while avoiding saturation of the upper return pole 250.

It should be understood that the taper 260 may extend either more or less than is shown in FIG. 2A. The taper may extend upwards to an end of the upper return pole 250 opposite the ABS (not shown), such that the maximum gap width is at the end of the shield opposite the ABS. The gap layer thickness increases from a first thickness (the throat gap width) at the ABS to greater thicknesses at a first distance from the ABS, to a greatest thickness at a second distance (greater than the first distance) from the ABS.

Figure 2B:
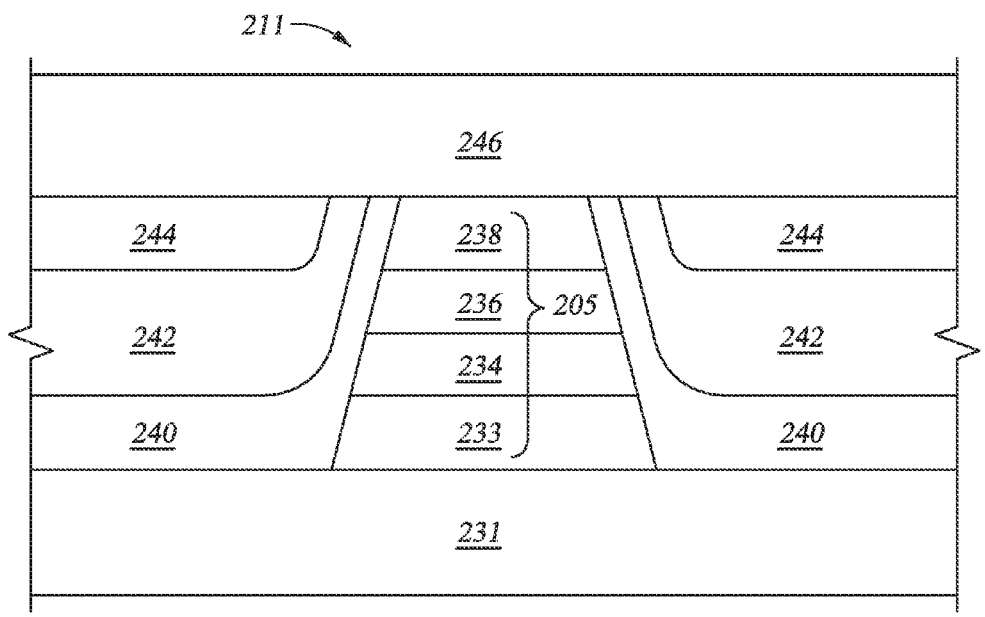
FIG. 2B is a schematic cross-sectional view of portions of the magnetic head according to one embodiment.

FIG. 2B is a schematic cross-sectional view of portions of magnetic head 211 according to one embodiment. The thickness and the width of each layer are for example only, and each layer may be thicker/thinner and/or wider/narrower. The magnetic head 211 includes a first shield layer 231. The first shield layer 231 may comprise a ferromagnetic material. Suitable ferromagnetic materials that may be utilized include Ni, Fe, Co, NiFe, NiFeCo, NiCo, CoFe and combinations thereof.

The magnetic head 211 also includes a sensor structure 205 comprising a pinned magnetic layer 233, a barrier layer 234, a free layer 236 and an optional capping layer 238. The pinned magnetic layer 233 may be one of several types of pinned layers, such as a simple pinned, antiparallel pinned, self pinned or antiferromagnetic pinned. For purposes of simplicity, the sensor will be described herein as antiparallel pinned. The antiferromagnetic pinned sensor has a first antiparallel pinned layer, a second antiparallel pinned layer, and a non-magnetic, antiferromagnetic coupling layer, such as Ru sandwiched between the two pinned layers. The first and second antiparallel pinned layers can be constructed of several magnetic materials, such as NiFe or CoFe, and have magnetic moments that are pinned by exchange coupling of the first antiparallel pinned layer with an antiferromagnetic layer. The antiferromagnetic layer may include materials such as PtMn, iridium, or rhodium. The barrier layer 234 may comprise an insulating material such as MgO or alumina. The free layer 236 may comprise ferromagnetic material such as Co, CoFe, CoFeB, NiFe or combinations thereof. The capping layer 238 may comprise a material to protect the sensor from damage such as ruthenium, iridium, tantalum or combinations thereof.

Following the formation of the sensor structure 205 (discussed in detail below), an insulating layer 240 may be deposited on the first shield layer 231 as well as the sidewalls of the sensor structure 205. The insulating layer 240 may comprise an insulating material such as aluminum oxide, silicon nitride or silicon oxide. The insulating layer 240 may be deposited by well known deposition methods such as atomic layer deposition (ALD), chemical vapor deposition (CVD), sputtering, ion beam deposition (IBD) and etc. After the insulating layer 240 is deposited, a hard bias or a soft side-shield layer 242 is then deposited. The hard bias layer or soft side-shield 242 may comprise a material having a high magnetic moment such as CoFe or NiFe.

Once the hard bias layer or soft side-shield 242 is deposited, a capping structure 244 may be formed. In one embodiment, the capping structure 244 may comprise a multiple layer structure comprising a first tantalum layer, an iridium layer, and a second tantalum layer. After one or more planarization process, a second shield layer 246 may be deposited over the capping structure 244 and the sensor structure 205. The second shield layer 246 may comprise a ferromagnetic material. Suitable ferromagnetic materials that may be utilized include Ni, Fe, Co, NiFe, NiFeCo, NiCo, CoFe and combinations thereof.

Figure 3A:
FIGS. 3A-3P illustrate the process of making a sensor structure of FIG. 2B according to one embodiment.
Figure 3O:
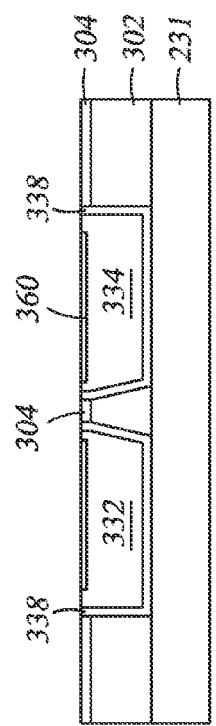
Figure 3N:
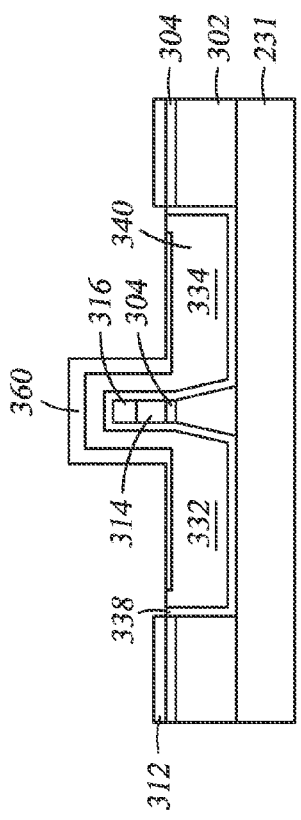
Figure 3P:
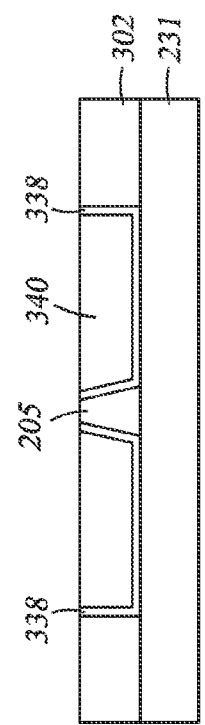

In order to form the sensor structure 205, a hard mask stencil is formed over the layers 233, 234, 236 and 238 to help shaping the sensor structure 205. Typically a conventional mask stencil has a height of about 100 nanometers (nm) and a width of about 30 to 40 nm. As the sensor structure 205 gets narrower, a shallower and narrower hard mask stencil with better control on both track width and height within wafer and wafer to wafer should be utilized. FIGS. 3A-3P illustrate the process of making the sensor structure 205 utilizing such shallow and narrow hard mask stencil.

As FIG. 3A illustrates, the sensor layer 302 is deposited over the first shield layer 231. The sensor layer 302 may include the pinned magnetic layer 233, the barrier layer 234, the free layer 236 and the optional capping layer 238. A first mask layer 304 is deposited over the sensor layer 302. The first mask layer 304 may be a diamond-like carbon (DLC) layer that is deposited by plasma enhanced chemical vapor deposition (PECVD), ion beam deposition (IBD), or any other suitable deposition process. In one embodiment, the first mask layer 304 is deposited by IBD and has a thickness of about 3 nm to about 8 nm. One of the functions of the first mask layer 304 is to serve as a CMP stop layer as discussed below. In FIG. 3B, a bi-layer structure 306 is deposited over the first mask layer 304. The bi-layer structure 306 includes a release layer 308 and a photoresist layer 310. The release layer 308 may be polydimethylglutarimide (PMGI) and the photoresist layer 310 may be a polyphenolic polymer or polyvinylphenol. Gaps (or undercuts) 307 and 309 are formed between the photoresist layer 310 and the first mask layer 304 at the bottom of the bi-layer structure 306. During the photolithography process there is more release layer 308 being removed and the recessed sides of the release layer 308 causes undercuts 307 and 309 below the photoresist layer 310.

As shown in FIG. 3C, an RIE stop layer 312 (as will be discussed in detail later) is deposited over the uncovered portions of the first hard mask layer 304 and the photoresist layer 310. The RIE stop layer 312 also covers the side walls of the photoresist layer 310; however, the undercuts 307, 309 are not sealed in by the RIE stop layer 312 because of the gap 307 and 309. The RIE stop layer 312 may be silicon nitride (SiN), tantalum oxides (TaO, $Ta_2O_3$, $Ta_2O_5$), silicon carbide (SiC), silicon dioxide ($SiO_2$), silicon oxynitride ($SiO_xN_y$), or other suitable material. In one embodiment, the RIE stop layer 312 is SiN having a thickness of about 2 nm to 8 nm and is deposited by ALD, PECVD, IBD, or sputtering method. Next, the bi-layer structure 306 is subjected to a photoresist stripper for dissolving the release layer 308 and releasing the photoresist layer 310 from the first mask layer 304. The photoresist stripper dissolves the release layer 308 and photoresist layer 310 by entering into the undercuts 307, 309. An exemplary photoresist stripper for the release layer 308 and the photoresist layer 310 is N-methyl pyrrolidone (NMP). As shown in FIG. 3D, after the removing of the bi-layer structure 306, the RIE stop layer 312 covers portions of the first mask layer 304, and the portions are called the field area. The exposed portion of the first mask layer 304 not covered by the RIE stop layer 312 is called the device area.

Next, as shown in FIG. 3E, a second mask layer 314 is deposited on the exposed first hard mask layer 304 (device area) and on the RIE stop layer 312 (field area). In one embodiment, the second mask layer 314 is a polymer-like carbon (PLC), which is much softer than DLC of the first mask layer 304, and has a thickness of about 5 nm to about 10 nm over the first mask layer 304 and can be deposited by either PECVD or IBD method. The second mask layer 314 serves as a release layer in the CMP process as discussed below in detail. A third mask layer 316 is deposited over the second mask layer 314, as shown in FIG. 3F. In one embodiment, the third mask layer 316 is a material that has a low milling rate, such as C or DLC and has a thickness of about 5 nm to about 10 nm. The third mask layer 316 may be deposited by any suitable process, such as IBD, PECVD or sputtering.

In FIG. 3G, a fourth mask layer 318 is deposited over the third mask layer 316. The fourth mask layer 318 may be a dielectric film or a thin metal layer. In one embodiment, the fourth mask layer 318 is a dielectric hard mask layer. The dielectric hard mask layer 318 may be constructed of a dielectric material and is preferably constructed of a silicon-containing hard mask material such as silicon oxide, silicon nitride, silicon oxynitride which may be deposited using PECVD, IBD or sputtering method, or a silicon-containing organic material such as SIHM® (Shin-Etsu Chemical Co., Ltd.) or UVAS (Honeywell International Inc.) and etc, which may be spin-coated on and cured at elevated temperature from 150 degrees Celsius to 250 degrees Celsius. In various approaches, the thickness of the dielectric hard mask layer 318 may depend on the total thickness of the first mask layer 304, the second mask layer 314 and the third mask layer 316. Generally, the thicker the total thickness of 304, 314 and 316, the thicker the dielectric hard mask layer 318 will preferably be. The typical thickness of the silicon containing dielectric hard mask layer 318 is about 5 nm to about 30 nm.

In one embodiment, an optional bottom anti-reflective coating (BARC) may be deposited over the dielectric hard mask layer 318. The determination of whether a BARC layer is desirable depends on the requirements of the photolithograph and on the material used for the dielectric hard mask layer 318. For example, if the dielectric hard mask layer 318 is a material that acts as a BARC, then no BARC layer is deposited. Such materials include silicon oxynitride, SIHM® (Shin-Etsu Chemical Co., Ltd.), UVAS (Honeywell International Inc.), and etc. In other cases, some form of BARC is desirable to control photolithography parameters such as reflective swing and photo CDs, and a BARC layer is deposited by any suitable deposition method such as spin coating and then baking. For simplicity, hereafter the dielectric hard mask layer 318 represents both the mask layer and the BARC layer if any.

Next in FIG. 3H, a photoresist layer 352 is deposited over the dielectric hard mask layer 318. A photolithography process is then performed to form a photoresist mask in which only a small portion of the photoresist layer 352 remains on the dielectric hard mask layer 318 in the device area, as shown in FIG. 3H, and the remaining portion of the dielectric hard mask layer 318 is exposed.

Next, a first RIE process is performed to remove portions of the dielectric hard mask layer 318 that are not protected by the photoresist mask 352, as shown in FIG. 3I. The RIE may use fluorocarbon based gas chemistry mixed with other gases as etchants to perform the etching. In one approach, this RIE may preferably be performed in a fluorine containing plasma chemistry such as one that contains $CF_4$, $CHF_3$, Ar, He, $O_2$ and etc., a combination thereof, or any other compound which would be apparent to one skilled in the art upon reading the present description. It is preferable that both $CF_4$ and $CHF_3$ gas flows are in the range of 5 sccm to 50 sccm, the He gas flow is no more than 30 sccm, and the oxygen gas flow is between 1 sccm to 10 sccm. According to an illustrative approach, the first RIE may additionally include transferring the image of the photoresist mask 352 onto the under-lying dielectric hard mask layer 318 by removing portions of the dielectric hard mask layer 318 that are not protected by the photoresist mask 352, leaving a structure as shown in FIG. 3I.

While any suitable tool known in the art may be used, one plasma tool especially suitable for the RIE process to etch the dielectric hard mask material and polymer mask under-layer is Plasma-Therm's VERSALOCK® etcher, which is an inductively coupled plasma (ICP) etch system in which the plasma is generated by means of inductively coupling 2 MHz RF power (the source power) while independently controlling the ion energy directed toward the substrate via 13.56 MHz bias power. This separate power control allows a wider range of RIE processes to be performed, ranging from highly chemical processes to highly physical processes. The VERSALOCK® etcher is equipped with an Optical Emission Spectrometry (OES) endpoint system that allows precise control of the over-etch amount via the determination of etch endpoint.

Many other ICP etchers equipped with both source and bias power supplies, such as TCP9400DFM® from Lam Research Inc., or DPS® from Applied Materials Inc., can also be used for RIE the dielectric hard mask material and polymer mask under-layer. It is expected that the RIE process presented herein can be used in conjunction with many different ICP etchers.

In the first RIE process, to ensure all of the dielectric hard mask 318 in the area not protected by the photoresist 352 is completely removed, or the third mask layer 316 is completely exposed in the area not protected by the photoresist mask 352, a certain amount of over-etch is applied, the percentage of the over etch time can be ranging from 20% to 60%. At the end of the first RIE process, the pattern of the photoresist mask layer 352 is transferred onto the dielectric hard mask layer 318, and part of the photoresist mask 352 is consumed during the first RIE.

Referring to FIG. 3J, the image of the dielectric hard mask 318 may be transferred onto the layer disposed thereunder (i.e., layers 316, 314 and 304) using a second RIE which may have a different material selectivity than the first RIE, to form a stencil consisting of layers 318, 316, 314 and 304. In one approach, the second RIE is an oxygen or carbon dioxide based RIE. The preferable oxygen gas flow is about 5 sccm to 20 sccm, and the carbon dioxide gas flow is about 15 sccm to 50 sccm. Since the second RIE uses oxygen based plasma, the photoresist layer 352 remaining from the first RIE (and optional BARC layer if any) is etched away completely during the second RIE. Since the dielectric hard mask layer 318 has much slower etch rate (or high etch rate selectivity), only a small portion of the dielectric hard mask 318 is consumed, thus the mask pattern of the dielectric hard mask layer 318 is transferred to the third mask layer 316, the second mask layer 314 and the first mask layer 304, the portion of these three layers which are not protected by the dielectric hard mask layer 318 are etched away in the device area, and the remaining layers in the device area form a hard mask stencil 320. In addition, since the cap layer 312 is a kind of dielectric layer and also has high etch selectivity (i.e., it doesn't etch by oxygen based plasma), the second RIE stops on the cap layer 312 in the field area, thus the first mask layer 304 under the cap layer 312 is not etched, as shown in FIG. 3J. As a result of the two RIE processes, the hard mask stencil 320 is formed in the device area, as shown in FIG. 3J. Portions of the sensor layer 302 are exposed while the remaining portions of the sensor layer 302 are covered by the hard mask stencil 320 (in device area) and the first mask layer 304 (in field area). The resulting hard mask stencil 320 includes four layers and has a height (thickness) between about 30 nm and about 65 nm and a width between about 10 nm to about 30 nm. In one embodiment, the hard mask stencil 320 has a height of about 45 nm. The hard mask stencil 320 provides better wafer to wafer and within wafer control on mill stencil CD uniformity and height by combining both low RIE and low milling etch rate mask layers. The reduced height of the hard mask stencil 320 helps with symmetric junction shape formation and the narrow width of the hard mask stencil 320 helps with narrow track width read sensor fabrication.

To assist the liftoff process discussed below, a photoresist mask layer 330 is fabricated. The field area which is protected by the cap layer 312 is completely covered by the photoresist 330, and the device area (including the stencil 320) is exposed and has no photoresist over it at all, as shown in FIG. 3K. The thickness of the photoresist 330 is about 150 nm to 300 nm. After the formation of photoresist mask 330, an ion milling process with desired angle, time, strength and operation mode is performed to remove portions of the sensor layer 302 that are not protected by the hard mask stencil 320 and the photoresist mask 330. As a result of the ions milling through the sensor layer 302 and exposing the first shielding layer 231, channels 332, 334 are formed in the sensor layer 302, and a tapered reader sensor stack 205 is formed under the stencil 320, as shown in FIG. 3L. During the ion milling, the entire fourth mask layer 318 and a portion of the third mask layer 316 of the hard mask stencil 320 are consumed as a result of the ion milling process, and portions of the photoresist mask 330 are also removed in the ion mill. Thus the thickness of the photoresist mask 330 is reduced but still sufficient enough for liftoff process as discussed below. The remaining thickness of the photoresist mask layer 330 is about 50 nm to about 200 nm.

After the formation of sensor stack 205, as shown in FIG. 3M, an insulation dielectric layer 338 is first deposited as an insulation layer, followed by a magnetic hard bias (or soft side-shield) material 340 deposition into the channels 332, 334 and over the photoresist layer 330 and the top of the hard mask stencil 320. The insulation layer 338 and the hard bias (or soft side-shield) material 340 also cover side walls of the stencil 320, side walls of sensor 205 and side walls of photoresist mask 330. The suitable materials for the insulation layer can be various dielectric films such as silicon nitride, alumina, silicon oxide, tantalum oxide, silicon carbide, with thickness from about 2 nm to about 10 nm, and can be deposited by sputtering, PECVD or IBD method. The hard bias (or soft side-shield) material 340 may be a material that has a high magnetic moment such as CoFe or NiFe which can be deposited by sputtering method.

Another optional layer 360 may be deposited over the hard bias (or soft side-shield) material 340. The optional layer 360 may be diamond-like carbon, and has a thickness of about 2 nm to about 10 nm. As shown in FIG. 3N, the photoresist mask 330 along with the optional layer 360, the hard bias (or soft side-shield) material 340, and the insulation layer 338 covering the top and the side of the photoresist mask 330 may be removed. The removal may be achieved by first baking the structure at elevated temperature such as about 90 degrees Celsius to about 180 degrees Celsius and then cooling the structure rapidly, followed by one or more rounds of hot NMP liftoff. During heating and cooling, cracks are formed on the optional layer 360, the hard bias (or soft side-shield) material 340 and insulation layer 338, thus allowing the hot NMP at temperature from about 60 degrees Celsius to about 90 degrees Celsius to reach the covered photoresist mask 330 to liftoff the photoresist mask 330 and everything on the photoresist mask 330 in the field area. After the liftoff, the RIE stop layer 312 and the first mask layer 304 are remaining in the field area. The sensor 205, stencil 320, insulation layer 338, hard bias layer (or soft side-shield) 340 and optional layer 360 are still remaining in the device area.

Following the liftoff of photoresist mask 330, a CMP process is performed. In the field area, the CMP process removes the RIE stop layer 312 and stops on the first mask layer 304 since the dielectric material of the RIE stop layer 312 can be polished much faster than the DLC material of the first mask layer 304. In the channels 332, 334, the CMP is only removing a small portion of the optional layer 360 since the optional layer 360 is DLC material, thus protects the hard bias (or soft side-shield) material 340. On the stencil 320, since the second mask layer 314 is a polymer like carbon which is much soft than the DLC material of the first mask layer 304, when a CPM process is applied, the stencil breaks at the interface between the second mask layer 314 and the first mask layer 304. Anything on the stencil 320 above the first mask layer 304 is removed. As a result of this CMP process, the exposed surface in the channels 332 and 334 of the device area comprises the optional layer 360, the exposed surface of the stencil comprises the first mask layer 304, and the exposed surface in the field also comprises the first mask layer 304, as illustrated in FIG. 3O. The above discussed removal process is achieved by a CMP process and thus is called CMP assisted liftoff. The resulting planar surface includes the first mask layer 304 (in both field area and on the sensor) and the optional layer 360.

After the CMP assisted liftoff, the remaining DLC film of the first mask layer 304 and the optional layer 360 are removed by an oxygen based RIE process, exposing the cap layer of the sensor structure 205 in device area, the hard bias (or soft side-shield) layer 340 and the sensor layer 302 in the field area. The top magnetic shield layer composed with NiFe is then deposited with sputtering method or metal plating method, and more subsequent processes are performed to fabricate a magnetic recording sensor.

Figure 4A:
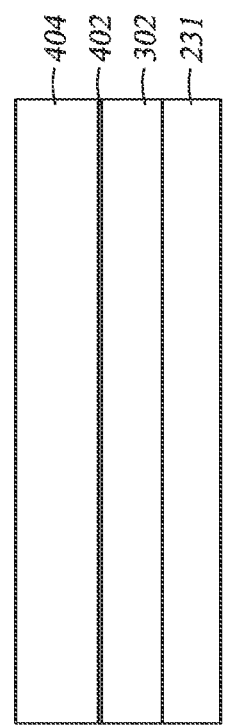

FIGS. 3A-3P illustrate one manner of making a sensor structure utilizing a shallow and narrow hard mask stencil. FIGS. 4A-4M illustrate an alternative way of making the sensor structure utilizing a different shallow and narrow hard mask stencil. As shown in FIG. 4A, the sensor layer 302 is deposited over the first shield layer 231. A cap layer 402 is deposited over the sensor layer 302, and a first mask layer 404 is deposited over the cap layer 402. In one embodiment, the cap layer 402 is iridium (Ir) and has a thickness of about 2 nm to about 6 nm and can be deposited using sputtering method. However, other suitable materials may also be used, such as ruthenium (Ru) with similar thickness. The first mask layer 404 may be a diamond-like carbon layer having a thickness between about 10 nm and about 50 nm and can be deposited using either PECVD or IBD process.

As shown in FIGS. 4B and 4C, a second mask layer 406 is deposited over the first mask layer 404 and a third mask layer 408 is deposited over the second mask layer 406. In one embodiment, the second mask layer 406 is a dielectric material such as silicon oxide and has a thickness of about 5 nm to about 20 nm. However, other suitable dielectric materials may also be used, such as silicon, silicon nitride, silicon carbide, silicon oxynitride or tantalum oxide. The dielectric material 406 can be deposited using PECVD, IBD or sputtering method. The third mask layer 408 may be a regular non-silicon based BARC layer or a silicon based BARC layer such as SIHM® (Shin-Etsu Chemical Co., Ltd.), UVAS (Honeywell International Inc.) and etc., with a thickness ranging from about 20 nm to 60 nm. A photoresist layer is coated and baked over the third mask layer 408, a photolithography process is performed, and a photoresist mask 409 is formed on the third mask layer 408, exposing portions of the third mask layer, as shown in FIG. 4C.

Next in FIG. 4D, a first RIE process containing fluorocarbon such as $CF_4/CHF_3$ mixed with other gases such as oxygen, argon and helium is performed. Portions of the third mask layer 408 not protected by the photoresist mask 409 is etched away, and with continuing of the RIE, a portion of the second mask layer 406 and a portion of the first mask layer 404 not protected by the photoresist mask 409 are also removed. Although the third mask layer 408 and the second mask layer 406 are etched through in the area not protected by the photoresist mask 409, the first mask layer is not etched through. The RIE process stops on the first mask layer 404, and the etch depth of the first mask layer 404 depends on the total over etch amount of the third and second mask layers 408, 406. A portion of the photoresist mask 409 is consumed in the first RIE and the thickness is reduced. As the result of the first RIE, the remaining photoresist mask 409, the third mask 408, the second mask layer 406, and a portion of the first mask layer 404 form a stack 411. A portion of the first mask layer 404 having the entire width "W" and depth "D" is not affected by this first RIE and is labeled with 410. Thus, the stack 411 sits on a mask layer 410 that has a thickness less than the first mask layer 404. In one embodiment, the thickness of the mask layer 410 is half of the first mask layer 404. The remaining photoresist layer 409 may or may not be removed by a wet strip process depending on the needs.

A photoresist layer is then coated and baked, and a photolithography is performed to form a photoresist assisted CMP (PAC) photoresist mask 412 on the first mask layer 410, as shown in FIG. 4E. The photoresist mask 412 covers only the field area, leaving the stack 411 and surrounding area (i.e., channel areas formed in the ion mill as discussed later) exposed. The channel areas (i.e., the portions of the mask layer 410 neither protected by the photoresist layer 412 nor the stack 411) is removed by a second RIE process based on the oxygen plasma chemistry, exposing the cap layer 402 in the channel areas. Since the PAC photoresist mask 412 is applied with enough thickness that there is sufficient remaining PAC photoresist mask 412 leftover in the field area. The remaining photoresist mask 409 is completely removed in the second RIE process, and the second RIE is stopped on the third mask layer 408 if the third mask layer 408 is a silicon based BARC material such as SIHM® (Shin-Etsu Chemical Co., Ltd.), UVAS (Honeywell International Inc.), which has high etch selectivity so only a small amount of the top portion is etched away. If the third mask layer 408 is a regular non-silicon based BARC layer, the third mask layer 408 is completely removed in the second RIE process, and since the second mask layer 406 is a dielectric based mask layer, the second RIE will not etch the second mask layer 406, protecting the underneath mask layer 404 from being etched. A hard mask stencil 420, consisting of the third mask layer 408, the second mask layer 406 and the first mask layer 404, is formed, as shown in FIG. 4F. The hard mask stencil 420 has a width between about 10 nm and about 30 nm and a height between about 20 nm and about 60 nm. In one embodiment, the hard mask stencil 420 has a height of about 40 nm.

To form the sensor structure, an ion milling is performed to remove portions of the cap layer 402 and the sensor layer 302 not protected by the photoresist layer 412 and the hard mask stencil 420. Channels 432 and 434 in the sensor layer 302 are formed and portions of the first shield layer 231 are exposed, as shown in FIG. 4G. In addition, the third mask layer 408, the second mask layer 406, and a portion of the first mask layer 404 of the hard mask stencil 420 are also consumed as a result of the ion milling process. Thus, disposed above the sensor structure 205 is a mask layer 436, which is the remaining portion of the first mask layer 404 and the cap layer 402. Portion of the photoresist mask layer 412 is also consumed but there is still enough thickness left over for the later liftoff process.

Next, an insulation layer 414 such as silicon nitride, alumina, or silicon oxide, or silicon carbide is deposited with a thickness from 2 nm to 10 nm, covering the top and side walls of the PAC photoresist mask 412, the top and side walls of the mask layer 436, the side walls of the sensor 205, and the exposed channel areas 432 and 434. The insulation layer 414 can be deposited using IBD or PECVD method. Then a side-shield layer (or a hard bias layer) 440 is deposited on the insulation layer 414, as shown in FIG. 4H. The side-shield or hard bias layer 440 may be a NiFe which can be deposited by sputtering method or a hard bias material that has a high magnetic moment such as CoFe.

Figure 4J:
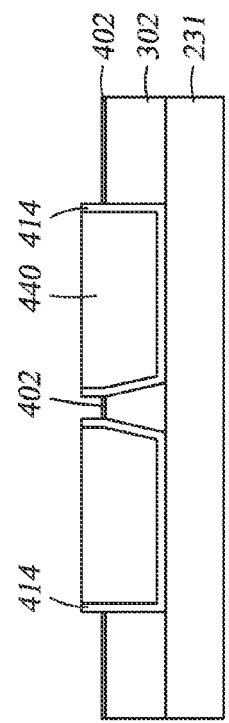
Figure 4L:
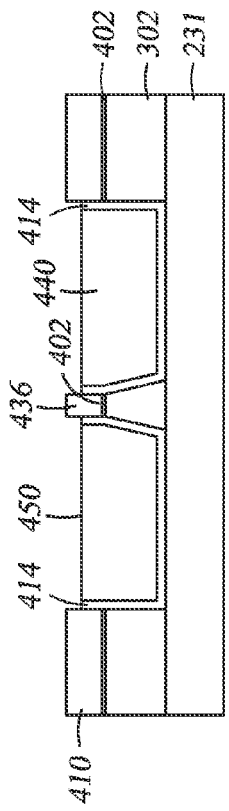
Figure 4K:
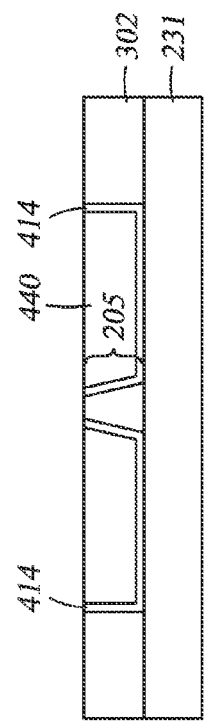
Figure 4M:
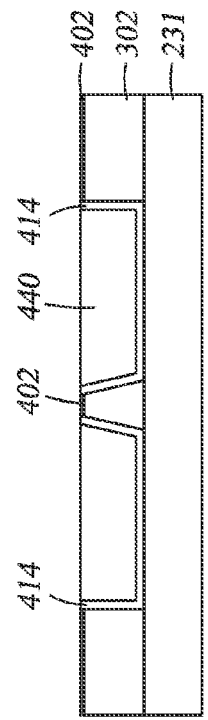

A liftoff process using hot NMP is performed to remove the PAC photoresist layer 412 and portions of the bias layer 440 covering the top and the sides of the PAC photoresist layer 412, exposing the first mask layer 410 in the field area, as shown in FIG. 4I. The removal process leaves an uneven surface of the bias layer 440, as shown in FIG. 4I. The uneven surface of the bias material 440 is then planarized by a CMP process. The resulting bias layer 440 is planar and has a surface 450 that is below the mask layers 410, 436, as shown in FIG. 4J. The mask layers 410, 436, which are carbon based films, are subsequently removed by an oxygen based RIE process, exposing the cap layer 402. As shown in FIG. 4K, since the side-shield or hard bias layer 440 is not etched by the oxygen based plasma, the side-shield or the bias layer 440 now extends above the cap layer 402. The portions of the side-shield or the hard bias layer 440 extending above the cap layer 402 are then removed by another CMP process, and the cap layer 402 serves as the CMP stop layer so that only the side-shield (the hard bias) layer 440 is removed. This second CMP process is controlled in such way that the remaining bias layer 440 and the cap layer 402 are planar, as shown in FIG. 4L. Lastly, the cap layer 402 and a top portion of the side-shield (or hard bias) 440 which had been oxidized in the oxygen plasma are removed by an ion milling process, exposing the sensor structure 205 and the sensor layer 302, as shown in FIG. 4M. The method of forming a sensor structure utilizing a hard mask stencil, as illustrated by FIGS. 4A-4M, does not including utilizing a release layer. Instead, the method includes a two-step CMP process.

In summary, a shallow and narrow hard mask stencil is utilized to form a sensor structure. In one embodiment, the hard mask stencil includes four distinct layers. In another embodiment, the hard mask stencil includes three layers of different materials and utilizes a two-step CMP process in the forming of the sensor structure.

While the foregoing is directed to embodiments of the present invention, other and further embodiments of the invention may be devised without departing from the basic scope thereof, and the scope thereof is determined by the claims that follow.

What is claimed is:
1. A method for forming a read head, comprising:
forming a sensor layer on a substrate;
forming a first mask layer comprising a first material over the sensor layer;
forming a bi-layer structure over a first portion of the first mask layer and leaving a second portion of the first mask layer exposed;
forming a cap layer over the second portion of the first mask layer and the bi-layer structure;
removing the bi-layer structure and a portion of the cap layer disposed over the bi-layer structure to expose the first portion of the first mask layer;
forming a second mask layer comprising a second material over the first portion of the first mask layer and the cap layer;
forming a third mask layer comprising a third material over the second mask layer;
forming a fourth mask layer comprising a fourth material over the third mask layer;
forming a photoresist mask over the fourth mask layer; and
removing a portion of the fourth mask layer, the third mask layer, the second mask layer, and the first mask layer to form a hard mask stencil and to expose a portion of the sensor layer.
2. The method of claim 1, further comprising:
removing the exposed portion of the sensor layer to form one or more channels in the sensor layer; and
depositing a bias material in the channels.
3. The method of claim 1, wherein the hard mask stencil has a height between about 30 nm and about 65 nm.
4. The method of claim 3, wherein the hard mask stencil has a width between about 10 nm and about 30 nm.
5. The method of claim 3, wherein the first mask layer comprises diamond-like carbon.
6. The method of claim 5, wherein the second mask layer comprises polymer-like carbon.
7. The method of claim 6, wherein the third mask layer comprises a material selected from the group consisting of carbon and diamond-like carbon.
8. The method of claim 7, wherein the fourth mask layer comprises a dielectric hard mask.
9. The method of claim 1, wherein the cap layer comprises a dielectric material selected from the group consisting of SiN, TaO, SiC, $SiO_2$ and $SiO_xN_y$.
10. A method for forming a read head, comprising:
forming a sensor layer on a substrate;
forming a cap layer over the sensor layer;
forming a first mask layer having a first thickness over the cap layer;
forming a second mask layer over the first mask layer;
forming a third mask layer over the second mask layer;
forming a photoresist mask over the third mask layer;
removing a portion of the third mask layer, the second mask layer, and the first mask layer to form a stack, wherein the stack is disposed on a remaining first mask layer having a second thickness;

forming a photoresist layer over portions of the remaining first mask layer;

removing the remaining first mask layer not covered by the stack and the photoresist layer to form a hard mask stencil and to expose portions of the cap layer; and removing portions of the cap layer and the sensor layer not covered by the hard mask stencil and the photoresist layer to form one or more channels in the sensor layer.

11. The method of claim 10, wherein the cap layer comprises a material selected from the group consisting of iridium and ruthenium.

12. The method of claim 11, wherein the first mask layer comprises diamond-like carbon and the first thickness is between about 10 nm and about 50 nm.

13. The method of claim 11, wherein the second thickness is half of the first thickness or less.

14. The method of claim 12, wherein the second mask layer comprises a material selected from the group consisting of Si, SiN, SiC, $SiO_xN_y$, $SiO_2$ and TaO.

15. The method of claim 14, wherein the third mask layer is either a non-silicon based BARC layer or a silicon based BARC layer.

16. The method of claim 10, wherein the hard mask stencil has a width between about 10 nm and about 30 nm and a height between about 20 nm and about 60 nm.

17. The method of claim 10, further comprising depositing a bias material in the channels.

18. The method of claim 17, further comprising:
forming a top surface comprising the remaining first mask layer and the bias material;

removing a portion of the bias material to expose the remaining first mask layer disposed over a sensor structure;

removing the remaining first mask layer to expose the cap layer, wherein a remaining bias layer extends above the cap layer; and planarizing the remaining bias layer so the bias layer is planar with the cap layer.

19. A method for forming a read head, comprising:
forming a top surface comprising a mask layer and a bias layer;

removing a portion of the bias layer to expose the mask layer disposed over a sensor structure;

removing the mask layer to expose a cap layer, wherein a remaining bias layer extends above the cap layer; and planarizing the remaining bias layer so the bias layer is planar with the cap layer.

20. The method of claim 19, wherein the mask layer comprises diamond-like carbon.

21. The method of claim 20, wherein the bias layer comprises CoFe or NiFe.

22. The method of claim 21, wherein the cap layer comprises a material selected from the group consisting of iridium and ruthenium.

23. The method of claim 19, wherein the removing a portion of the bias layer comprises a first CMP process.

24. The method of claim 19, wherein the planarizing the remaining bias layer comprises a second CMP process.

* * * * *